United States Patent
Kienke et al.

(10) Patent No.: US 7,527,336 B2
(45) Date of Patent: May 5, 2009

(54) RECLINER MECHANISM

(75) Inventors: Ingo Kienke, Wermelskirchen (DE); Hans-Rudi Schulz, Remscheid (DE)

(73) Assignee: Johnson Controls Technology Company, Holland, MI (US)

( * ) Notice: Subject to any disclaimer, the term of this patent is extended or adjusted under 35 U.S.C. 154(b) by 399 days.

(21) Appl. No.: 10/549,554

(22) PCT Filed: Mar. 4, 2004

(86) PCT No.: PCT/EP2004/002160

§ 371 (c)(1), (2), (4) Date: Sep. 19, 2005

(87) PCT Pub. No.: WO2004/082983

PCT Pub. Date: Sep. 30, 2004

(65) Prior Publication Data

US 2006/0181131 A1    Aug. 17, 2006

(30) Foreign Application Priority Data

Mar. 19, 2003    (DE) ................................ 103 12 140

(51) Int. Cl.
*B60N 2/02* (2006.01)

(52) U.S. Cl. ................ 297/374; 297/378.1; 297/378.12

(58) Field of Classification Search ............. 297/378.1, 297/378.11, 374, 378.12
See application file for complete search history.

(56) References Cited

U.S. PATENT DOCUMENTS

| | | | | |
|---|---|---|---|---|
| 4,314,729 | A * | 2/1982 | Klueting ............ | 297/378.12 X |
| 4,696,515 | A * | 9/1987 | Heesch .............. | 297/374 X |
| 4,705,319 | A * | 11/1987 | Bell .................. | 297/378.11 X |
| 6,209,955 | B1 | 4/2001 | Seibold | |
| 2002/0089225 | A1 | 7/2002 | Bruck et al. | |
| 2002/0098224 | A1 | 7/2002 | Gehlsen | |

OTHER PUBLICATIONS

Search Report by European Patent Office for International Application No. PCT/EP2004/002160; mailing date Jul. 6, 2004; 2 pages.

* cited by examiner

*Primary Examiner*—Anthony D Barfield
(74) *Attorney, Agent, or Firm*—Foley & Lardner LLP

(57) ABSTRACT

A device for blocking and adjusting the inclination of fittings, such as a recliner mechanism, a vehicle seat, has a first fitting part which has a latch tooth, and a latching element (2) which has a mating latch tooth, the latch tooth and the mating latch tooth are brought into engagement and arrested in the engagement position by means of a clamping element under the force of a spring, acts on the latching element and is movable counter to the force of the spring via adjusting means. The clamping element has a toothing in which is engaged by a mating toothing situated on a toothed element, the force of the spring acts on the toothed element and acts indirectly on the clamping element via the toothing and mating toothing.

20 Claims, 4 Drawing Sheets

RECLINER MECHANISM

CROSS-REFERENCE TO RELATED APPLICATIONS

This application claims benefit to International Application No. PCT/EP2004/002160 filed on Mar. 4, 2004, and German application no. DE10312140.4, filed Mar. 19, 2003, all of which are incorporated herein by these references.

BACKGROUND

The invention relates generally to a device for blocking and adjusting the inclination of fittings, in particular for adjusting the inclination with respect to each of the two components situated on a vehicle seat, such as a seat part and a backrest part.

PRIOR ART

Known devices are disclosed in the documents DE 198 45 698 A1, DE 195 22 854 A1 and U.S. Pat. No. 4,836,608. In the case of the device for blocking adjustment fittings or a recliner mechanism on vehicle seats according to DE 198 45 698 A1, which adjustment fittings have a latching region which has a toothing, and a latching element which has a mating toothing, the toothing and the mating toothing can be brought into and out of engagement and can be arrested in the engagement position. The subject matter of the DE 198 45 698 application relates to a special tooth design, according to which, in the engagement position, the tips of the teeth at their apex maintain a distance from the corresponding tooth roots of the respectively opposite elements and the corresponding teeth bear against one another by means of the tooth flanks. The tooth flanks are connected to the apex via a curved transition region beginning at the tip end. The connection region, which is situated at the end of the tooth flanks, between tooth flanks and transition region is arranged displaced in the direction of the tooth root of the opposite element by means of a reduction of the transition radius. This design is intended to provide greater safety in the event of a higher force input.

The fitting of recliner mechanism for adjusting the inclination of backrests of motor vehicle seats that is disclosed in DE 195 22 854 A1 has a first articulated part and a second articulated part, one of which is connected fixedly to the seat and the other of which is connected fixedly to the backrest. In this case, the second articulated part is coupled pivotably to the first articulated part and has a latch teeth which can be fixed in different pivoting positions by means of a locking lever formed for engagement therewith. The locking lever has a mating teeth corresponding to the latch teeth of the second articulated part. The two toothings can be blocked in engagement divisions by means of a blocking lever. The blocking lever is mounted pivotably on the first articulated part, and locking lever and blocking lever have mutually complementary control surfaces. The blocking lever in turn bears an arresting lever, which is mounted pivotably, can be displaced via an adjusting means and has a projection which, in a first pivoting position of the arresting lever and in the blocking position of the blocking lever, bears against a stop surface of the first articulated part. In a second pivoting position, the projection is situated away from the stop surface of the first articulated part and therefore permits blocking lever and locking lever to pivot so as to be free. Here, too, this design is intended to provide greater safety in the event of a crash, in particular a satisfactory blocking of the pivoting position which has been set.

The device according to U.S. Pat. No. 4,836,608 also has a similar construction to the abovementioned fittings or recliner mechanisms. In all of the known devices, the clamping element, which is also referred or could also be referred to as a clamping cam, unit of blocking lever and arresting lever, "operation lever" or clamping eccentric, is driven via a tension spring which is fastened to this component and under the action of which the clamping element is moved into or secured in a position which produces or secures the engagement position of the latching element.

As adjusting means in order to move the clamping element counter to the force of the spring in such a manner that the latching element comes out of engagement, Bowden cables are mentioned and illustrated in DE 195 22 854 A1 and in DE 198 45 698, and a handling device designed integrally with the clamping element is mentioned and illustrated in U.S. Pat. No. 4,836,608. GB 2 059 496 A describes a device for blocking and adjusting the inclination of fittings, but which is not constructed according to the type described above for which a transmission rod is used as adjusting means. The transmission rod engages at both of its ends in fittings which are fitted on both sides of a seat.

The known use of tension springs for arresting and producing the engagement position has an unfavorable effect on the designing of the construction space, the "package", due to the required length of the springs and may also cause noises during the actuation due to the friction occurring in their attachment means during rotation. Since the spring is pivoted during the actuation, the spring may also, because of the changing angular position of the spring, have a force/travel characteristic in which the adjusting force, with increasing distance of the latching element from the fitting part with the latching toothing in an end region, no longer—as desired—rises, but rather drops again after a dead center position is exceeded. During a manual adjustment, this may undesirably influence the operator's sensation of control during actuation.

It would be an improvement to have a recliner device for blocking and adjusting the inclination of the type described above using structurally simple means such that a more favorable design of the construction space can be obtained, production of noise can be damped and an improved sensation of control during actuation can be produced for the operator.

SUMMARY

One embodiment of the present invention relates to a recliner mechanism including a device for blocking and adjusting the inclination in which a clamping element has a toothing in which a mating toothing engages and is situated on a toothed element and force of a spring acts on the toothed element and acts indirectly on the clamping element via the toothing and mating toothing.

In a preferred embodiment the spring can form a constructional unit with the toothed element, which includes a toothed element which is designed in the manner of a toothed wheel and is driven by a leg spring or spiral spring, and most preferrably in flat spiral spring, which is favorable in terms of construction space. The flat spiral or torsion spring of this type does not change its angular position when they become effective, and can advantageously also be dimensioned in such a manner that it has a desired, for example, a linearly or progressively rising, force/travel characteristic.

Further advantageous embodiments of the invention are disclosed in the description below. The invention is explained in more detail with reference to two exemplary embodiments illustrated in the attached drawing which are not intended to be limiting in any way.

BRIEF DESCRIPTION

FIG. 1 shows, in a cut open, perspective illustration, a device according to the invention for blocking and adjusting the inclination, according to one embodiment, FIG. 2 shows, in an enlarged illustration in comparison to FIG. 1, a clamping element and a constructional unit of a toothed element and a spring of a device according to the invention for blocking and adjusting the inclination, according to one embodiment of the invention.

DETAILED DESCRIPTION

Figure 1:
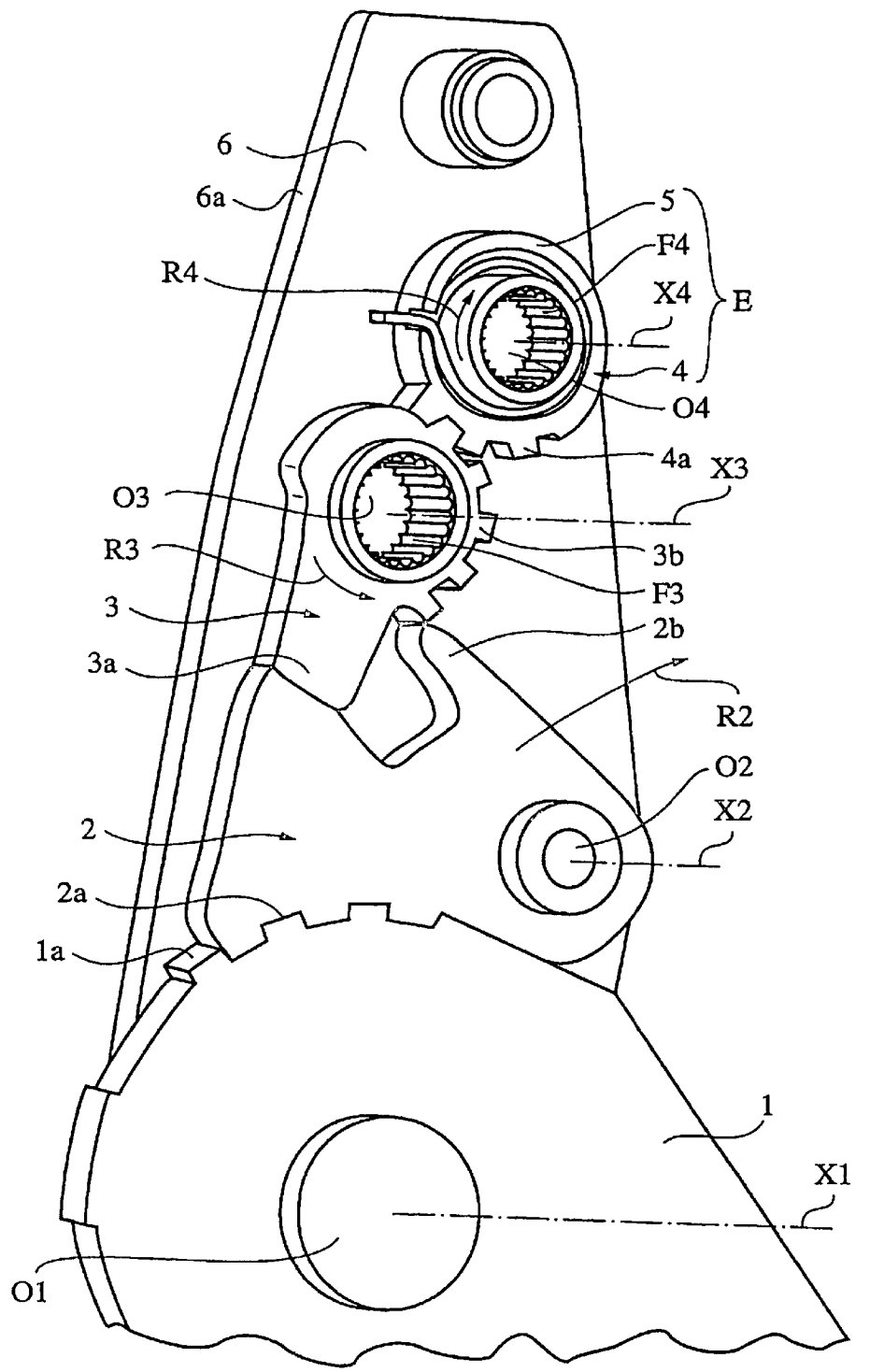

In the various figures of the drawing, identical parts are always also provided with the same reference numbers, with the result that they are generally also only described once in each case.

A device according to the invention for blocking and adjusting the inclination of fittings can be used in particular for adjusting the inclination with respect to each other of two components situated on a vehicle seat, such as a seat part and a backrest part as is commonly known as a recliner mechanism.

As FIG. 1 best shows, a device of this type for blocking and adjusting the inclination comprises a first fitting part 1 which has a latch tooth 1a, and a latch element 2 which has a mating latching toothing 2a and is designed in the manner of a pivotable pawl. The latch tooth 1a and the mating latch tooth 2a can be moved into engagement—and, if appropriate, as for the case illustrated in which this does not take place under the action of gravity, also out of engagement—and can be arrested in the engagement position by means of a clamping element 3 which acts on the latch element 2 and can be moved via adjusting means.

The clamping element 3 has, for moving the latch element 2, a control contour 3a which is used for interacting with a corresponding control contour 2b of the latching element 2.

In order to securely hold the latch element 2 in its engagement position in the latch tooth 1a of the first fitting part 1, i.e. in the self-locking pivoting position illustrated in FIG. 1, even in the event of dynamic loads, the clamping element 3 is spring-loaded. For this purpose, the clamping element 3 has a toothing or sector 3b which enlarges a mating toothing or sector 4a situated on a toothed element 4. In a manner favorable in terms of installation and construction space, the toothed element 4 forms with a spring 5 a constructional unit E which can be arranged into an otherwise free construction space in the fitting part. The force of the spring 5 thereby acts indirectly on the clamping element 3 via the mating toothing 4a and toothing 3b. In a preferred embodiment, the spring 5 is designed as a torsion spring (i.e., as a leg spring), as FIG. 2 best shows.

The toothing 3b of the clamping element 3 and the mating toothing 4a of the toothed element 4 are preferably designed as external toothings designed at least in the manner of segments, as illustrated in all of the figures. The first fitting part 1, the latch element 2, the clamping element 3 and the toothed element 4 can be pivoted relative to one another about respective pivot axes X1, X2, X3, X4. In this case, if a bevel gear toothing is not used, the pivot axes X1, X2, X3, X4 are in particular arranged parallel to one another. The first fitting part 1, the latching element 2, the clamping element 3 and the toothed element 4 here have fastening openings O1, O2, O3, O4 which are arranged concentrically about their respective pivot axes X1, X2, X3, X4 and are partially filled, in particular in the case of the first fitting part 1 and the latch element 2, by corresponding fastening elements (not referred to specifically).

The latch element 2, the clamping element 3 and the toothed element 4 are fastened to a second fitting part 6, the angular position of which, i.e. the inclination, relative to the first fitting part 1 can be changed and fixed with the aid of the recliner device according to the invention for blocking and adjusting the inclination. The first fitting part 1 can be fastened, for example, to a first component of a vehicle seat, such as a seat part, and the second fitting part 6 can be fastened to a second component of a vehicle seat, such as a backrest part, or vice versa.

As far as the construction of the second fitting part 6 is concerned, it should be noted that FIG. 1 involves a cut open illustration of a device according to the invention. This means that the second fitting part including a first wall 6a depicted and of a second wall (not illustrated) which covers the remaining components 1, 2, 3, 4, 5, and is essentially identical in design and is connected fixedly to the first wall. The components 1, 2, 3, 4, 5 are held in or between these walls via the fastening elements which have already been mentioned, engage in the fastening openings O1, O2, O3, O4 and are not referred to specifically in the figures. The adjusting means (likewise not illustrated) for moving the clamping element 3 may preferably be at least one transmission rod which acts on the clamping element 3 and/or on the toothed element 4 and in particular engages axially in the respective fastening opening O3, O4 thereof.

The operation of the device according to the invention for blocking and adjusting the inclination is as follows.

In the illustration shown in FIG. 1, there is a certain inclination with respect to each other of two components situated on a vehicle seat, such as a seat part and a backrest part. This inclination is expressed in the angular position of the first fitting part 1 with respect to the second fitting part 6. By means of the engagement of the latch tooth 1a of the first fitting part 1 in the mating latch tooth 2a of the latching element 2, this angular position is fixed and is secured by means of the clamping element 3 which is under the force of the spring 5. In order to bring the latch tooth 1a of the first fitting part 1 and the mating latch tooth 2a of the latching element 2 out of engagement, the toothed element 4 is moved counter to the force of the spring 5 with the aid of the adjusting means, to be precise is rotated in the direction of the arrow R4 shown in FIG. 1. The engagement of the mating toothing 4a of the toothed element 4 in the toothing 3b of the clamping element 3 means that, in consequence, the clamping element 3 is rotated or pivoted in the direction of the arrow R3. Owing to the interaction of the, in particular lug-like, control contour 3a of the clamping element 3 with the corresponding control contour 2b of the latching element 2, which contour is designed in particular as an engagement opening, the latching element 2 is pivoted and, as a result, the engagement of the mating latch tooth 2a of the latching element 2 in the latch tooth 1a of the first fitting part 1 is canceled. The inclination of the first fitting part 1 relative to the second fitting part 6 can then be adjusted by pivoting about the axis X1. The adjusting force acting counter to the force of the spring 5 is then canceled, and the latching element 2 returns under the action of the spring 5 into its engagement division by dynamics proceeding inversely to the movements illustrated.

Figure 2:
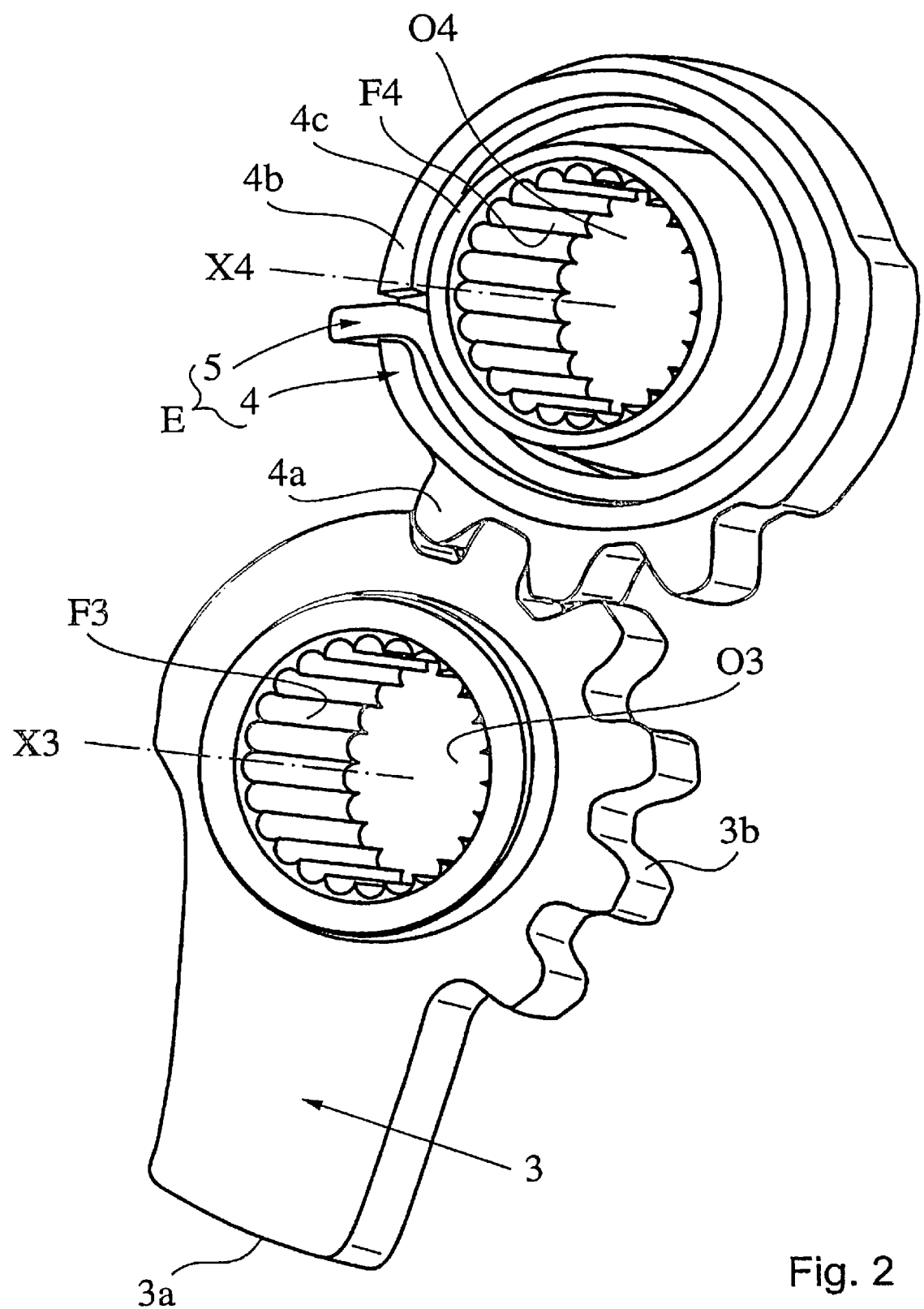

FIG. 2, shows an enlarged detail from FIG. 1, reveals that the toothed element 4 can advantageously be composed of an outer ring 4b and an inner ring 4c which are braced against each other by the spring 5. In this case, the spring 5 is arranged concentrically to the outer ring 4b and the inner ring 4c about the axis X4 and between the outer ring 4b and the inner ring 4c in a manner favorable in terms of construction space.

Figure 3:
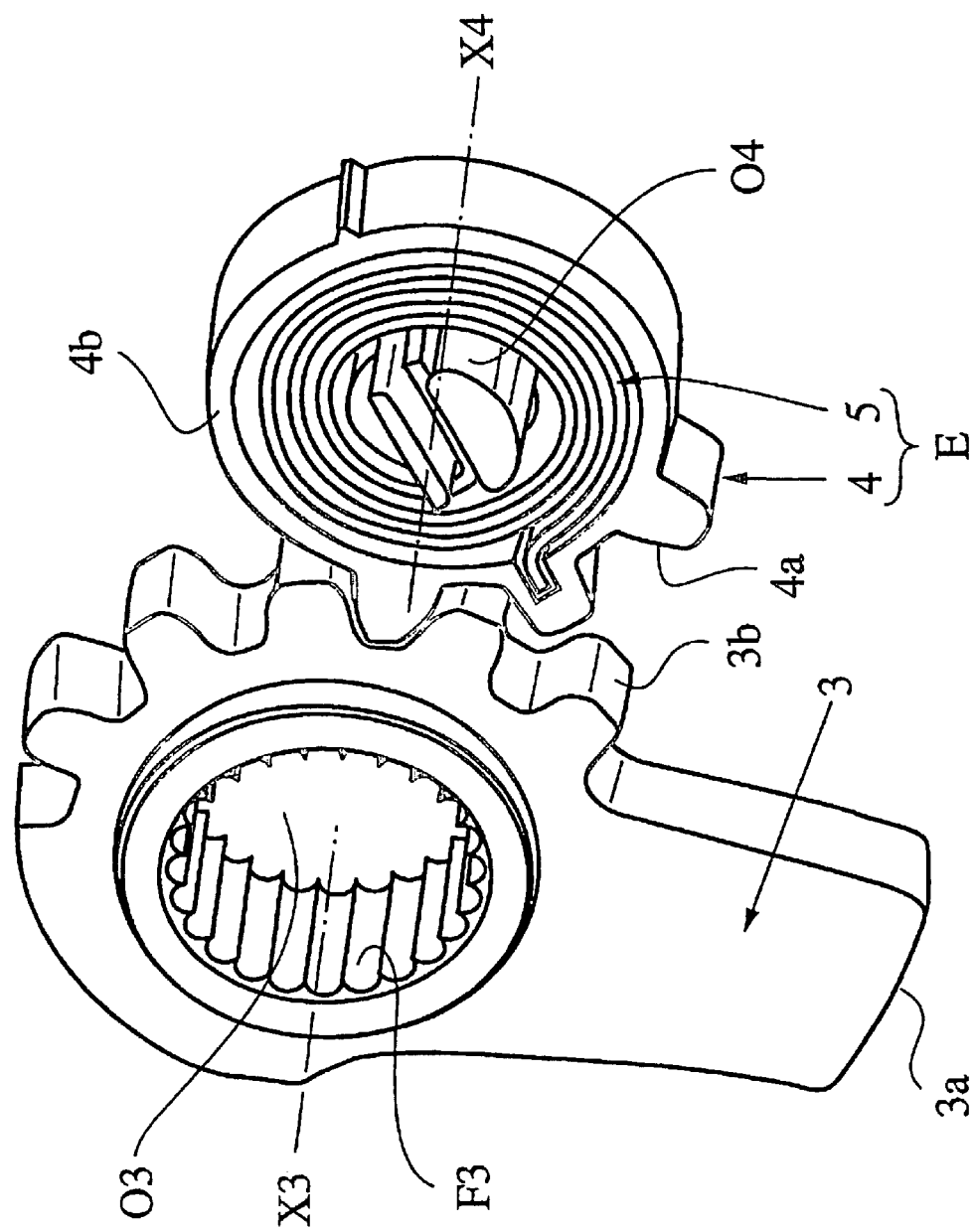
FIG. 3 shows, in an enlarged illustration in comparison to FIG. 1, a clamping element and a constructional unit of a toothed element and a spring of a device according to the invention for blocking and adjusting the inclination, according to an alternate embodiment of the invention.

FIG. 3 shows a further advantageous design of the spring 5 in the constructional unit E formed from toothed element 4 and spring 5. The spring 5 here is designed as a spiral spring, in particular as a flat spiral spring, and is likewise arranged concentrically about the axis X4 in the fastening opening O4 of the toothed element 4 in an extremely favorable manner in terms of construction space, i.e. in a space-saving manner. In this case, like the spring 5 in the first embodiment, it is encircled by an outer ring 4b which bears the mating toothing 4a on its outer circumference.

Although the design according to FIGS. 1 and 2 is more costly to manufacture in comparison with the embodiment according to FIG. 3, it has the advantage, as a function of the seat geometry, that the transmission rod which can be fitted in the fastening opening O4 is arranged to the rear and therefore outside the comfort region of the seat. If the seat geometry permits this, then for cost reasons the embodiment according to FIG. 3 is preferably used.

The invention is not restricted to the exemplary embodiments illustrated but rather also comprises all embodiments acting in an identical manner within the meaning of the invention. Thus, in particular, shaping, dimensioning and position of the constructional unit E and of its components toothed element 4 and spring 5 may differ from the embodiments illustrated. As an alternative to the fastening or torque or transmission rods mentioned as being preferred, it is also possible for other means, such as, for example, the Bowden cables already mentioned, to be used as the adjusting means.

Figure 4:
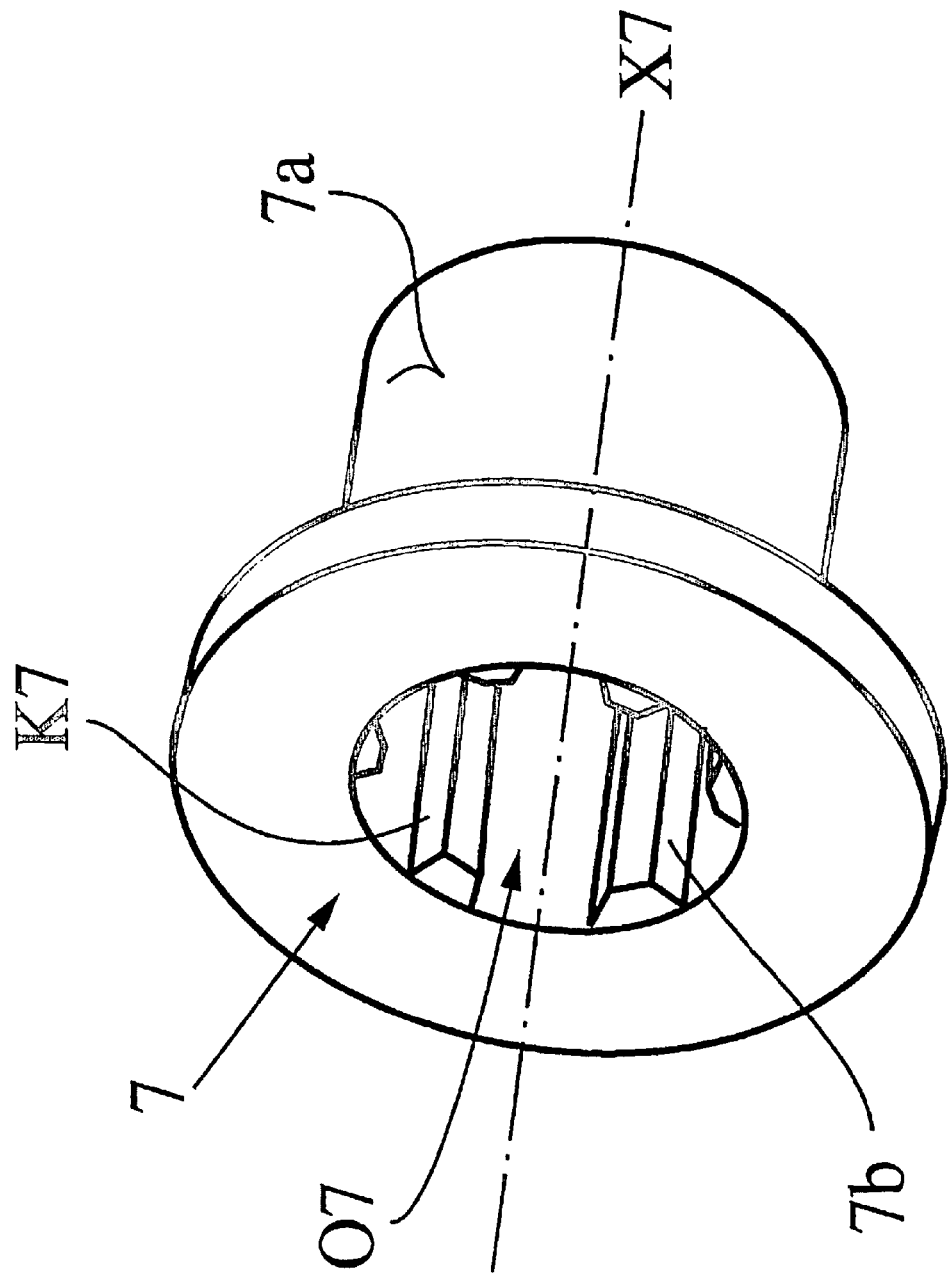
FIG. 4 shows, in a perspective illustration, a molded part which can be used in an advantageous development of the invention.

Furthermore, the person of ordinary skill in the art can supplement the invention by means of additional advantageous measures without departing from the scope of the invention. Thus, as likewise illustrated graphically a respective fine toothing F3, F4 can be provided around the periphery of the fastening openings O3, O4 of clamping element 3 and/or toothed element 4, into which fine toothing a molded profile part 7 (FIG. 4) for receiving one end of a transmission rod, which is used as an adjusting means in order to bring the first fitting part 1 and the latching element 2 out of engagement, can be pressed coaxially (X2 and/or X3 with X7). In this case, the bushing-like molded profile part 7 can have, in its fastening opening O7, a profiled inner contour K7 which can be positioned during the pressing-in operation in such a manner that the molded profile part 7 is arranged in a defined position with respect to the second fitting part 6. This defined position may exist, for example, by the distance of a marking point of the inner contour K7 from one or more reference points of the second fitting part 6, such as the penetration points of the axes X2, X3 of the latching element 2 or the clamping element 3. The effect achieved by this is that two devices according to the invention which are to be fitted on both sides of a seat part can be synchronized at a very early point, i.e. during the installation, and do not have to be coordinated with each other in a higher stage of assembly. As a result, different positions of the clamping element 2 that occur due to tolerances are compensated for, and the transmission rod can be fitted in a manner free from distortion. The molded profile part 7 may take up any desired position in an infinitely variable manner irrespective of the division of the inner contour K7, for example of a toothing of clamping element 3 and/or latching element 4.

The invention claimed is:

1. A recliner mechanism comprising:
a first fitting part including a first tooth;
a latching element including a second tooth that is engageable with the first tooth;
a clamping element engageable with the latching element, the clamping element including a third tooth; and
a toothed element including a fourth tooth and a spring, the fourth tooth being engageable with the third tooth, the spring being encircled by and at least partially received within the toothed element,
wherein the spring is configured to act on the toothed element and indirectly on the clamping element via the third tooth and the fourth tooth to hold the latching element in engagement with the first fitting part.

2. The recliner mechanism of claim 1 wherein the first fitting part, the latching element, the clamping element and the toothed element are pivotable relative to each other about respective pivot axes, the respective pivot axes being arranged parallel to one another.

3. The recliner mechanism of claim 2 wherein the first fitting part, the latching element, the clamping element and the toothed element each have a fastening opening arranged concentrically about the respective pivot axes.

4. The recliner mechanism of claim 1 wherein the toothed element comprises an outer ring and an inner ring, the spring being arranged concentrically with and between the outer ring and the inner ring.

5. The recliner mechanism of claim 1 wherein the clamping element includes a first fastening opening and the toothed element includes a second fastening opening, the first fastening opening and the second fastening opening each being configured to receive a transmission rod to accommodate different seating arrangements.

6. The recliner mechanism of claim 5 wherein a respective fine tooth is provided around an inner periphery of the first fastening opening and the second fastening opening.

7. The recliner mechanism of claim 5 further comprising a molded part configured to be inserted into the first fastening opening, the mold part having a profiled inner contour configured to receive a transmission rod.

8. The recliner mechanism of claim 1 further comprising a second filling part, wherein the latching element, the clamping element and the toothed element are fastened to the second fitting part.

9. The recliner mechanism of claim 1 wherein the spring comprises a torsion spring.

10. The recliner mechanism of claim 1 wherein the spring comprises a leg spring.

11. The recliner mechanism of claim 1 wherein the spring comprises a flat spiral spring.

12. The recliner mechanism of claim 1 wherein the clamping element further includes a control contour for interacting with a corresponding control contour of the latching element.

13. The recliner mechanism of claim 1 wherein the tooth of the clamping element and the mating tooth of the toothed element are each an external tooth segment.

14. A recliner mechanism comprising:
a first fitting part including a first tooth;
a latching element including a second tooth that is engageable with the first tooth;
a clamping element engageable with the latching element, the clamping element including a third tooth and a first fastening opening;

a toothed element including a fourth tooth and a second fastening opening, the fourth tooth being engageable with the third tooth, and a spring configured to act on the toothed element to hold the latching element in engagement with the first fitting part, wherein the first fastening opening and the second fastening opening are each configured to receive a transmission rod to accommodate different seating arrangements.

15. The recliner mechanism of claim 14 wherein the spring is encircled by the toothed element.

16. The recliner mechanism of claim 15 wherein the spring is configured to act directly on the toothed element and indirectly on the clamping element via the third tooth and the fourth tooth to hold the latching element in engagement with the first fitting part.

17. The recliner mechanism of claim 14 wherein the toothed element comprises an outer ring and an inner ring, the spring being arranged concentrically with and between the outer ring and the inner ring.

18. The recliner mechanism of claim 14 wherein the first fitting part, the latching element, the clamping element and the toothed element are coupled to a second fitting part and pivotable relative to each other about respective pivot axes, the respective pivot axes being arranged parallel to one another.

19. A recliner mechanism comprising:

a first fitting part including a first tooth;

a latching element including a second tooth that is engageable with the first tooth;

a clamping element engageable with the latching element, the clamping element including a third tooth and a first fastening opening;

a toothed element including a fourth tooth and a second fastening opening, the fourth tooth being engageable with the third tooth, and a spring configured to act on the toothed element to hold the latching element in engagement with the first fitting part, wherein the first fastening opening and the second fastening opening are each configured to receive a transmission rod to accommodate different seating arrangements, and wherein a respective fine tooth is provided around an inner periphery of the first fastening opening and the second fastening opening.

20. A recliner mechanism comprising:

a first fitting part including a first tooth;

a latching element including a second tooth that is engageable with the first tooth;

a clamping element engageable with the latching element, the clamping element including a third tooth and a first fastening opening;

a toothed element including a fourth tooth and a second fastening opening, the fourth tooth being engageable with the third tooth;

a spring configured to act on the toothed element to hold the latching element in engagement with the first fitting part; and a molded part configured to be inserted into the first fastening opening, the mold part having a profiled inner contour configured to receive a transmission rod, wherein the first fastening opening and the second fastening opening are each configured to receive the transmission rod to accommodate different seating arrangements.

* * * * *

UNITED STATES PATENT AND TRADEMARK OFFICE
CERTIFICATE OF CORRECTION

PATENT NO. : 7,527,336 B2
APPLICATION NO. : 10/549554
DATED : May 5, 2009
INVENTOR(S) : Kienke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 627 days.

Signed and Sealed this

Seventh Day of September, 2010

David J. Kappos
*Director of the United States Patent and Trademark Office*